United States Patent [19]
Eder

[11] 3,813,851
[45] June 4, 1974

[54] PROCESS AND APPARATUS FOR AT LEAST PARTLY REMOVING BY GRAVITY A PARTICULATE COMPONENT FROM A LIQUID DISPERSION

[75] Inventor: Theodor Eder, Vienna, Austria

[73] Assignee: Aspanger Kaolin- Und Steinwerke Aktiengesellschaft, Vienna, Austria

[22] Filed: Dec. 14, 1971

[21] Appl. No.: 207,773

[30] Foreign Application Priority Data
Dec. 15, 1970  Austria.............................. 11285/70

[52] U.S. Cl........................ 55/52, 55/193, 210/84, 210/521
[51] Int. Cl........................ B01d 19/00, B01d 21/00
[58] Field of Search ......... 55/52, 193, 206; 210/65, 210/73, 83, 84, 521, 522

[56] References Cited
UNITED STATES PATENTS

| | | | |
|---|---|---|---|
| 2,060,166 | 11/1936 | Bowen............................ | 210/521 X |
| 2,673,451 | 3/1954 | Gariel............................ | 210/521 X |
| 3,481,113 | 12/1969 | Burnham, Sr..................... | 55/193 X |
| 3,555,819 | 1/1971 | Burnham, Sr..................... | 55/193 X |

*Primary Examiner*—Charles N. Hart
*Assistant Examiner*—Richard W. Burks
*Attorney, Agent, or Firm*—Eric H. Waters

[57] ABSTRACT

A feed mixture is provided which comprises a liquid and a particulate component which is dispersed in said liquid and differs in specific gravity from said liquid. Said feed mixture is treated in a plurality of successive stages, each of which comprises a plurality of substantially identical separating spaces defined by inclined collecting surfaces. The particulate component is collected on said collecting surfaces and caused to travel along each collecting surface and from the collecting surfaces of each preceding stage to the collecting surfaces of the next succeeding stage along a predetermined path of travel. The liquid is caused to flow in said separating spaces and from each space along a predetermined liquid flow path, which is separated spaced from said path of travel. Said collected particulate component is withdrawn from the collecting surfaces of each stage in a first withdrawal area. The liquid is withdrawn from the separating spaces of each stage in a second withdrawal area, with is separated from said first withdrawal area. The angle between the horizontal components of the velocity of travel of the collected particulate component along said path of travel is changed by at least 90° as said collected particulate component is transferred from the collecting surfaces of each preceding stage to the collecting surfaces of the next succeeding stage so that said path of travel between successive stages is spaced from said liquid flow path.

31 Claims, 19 Drawing Figures

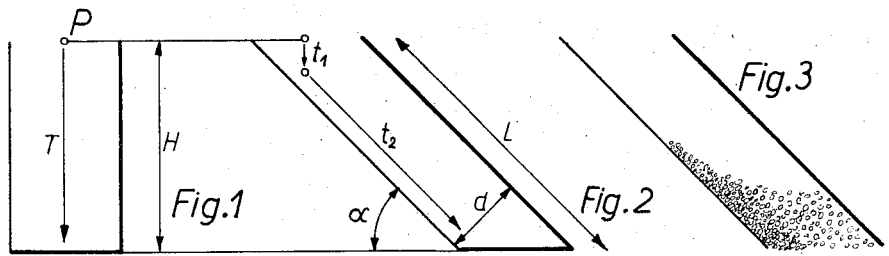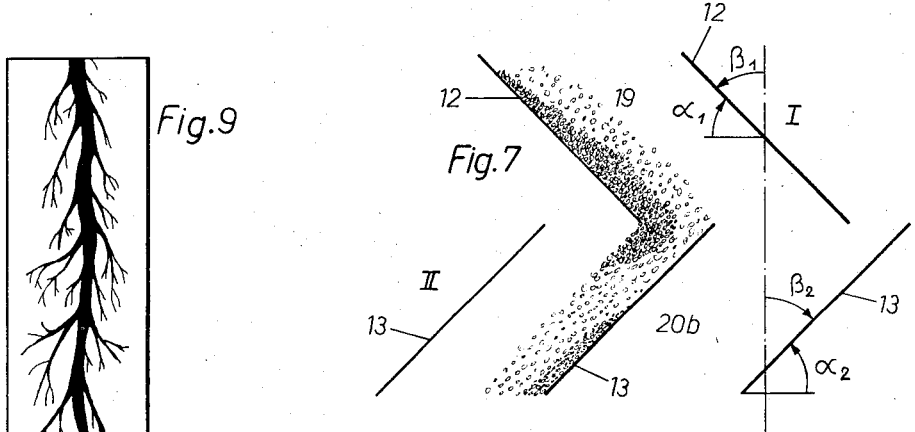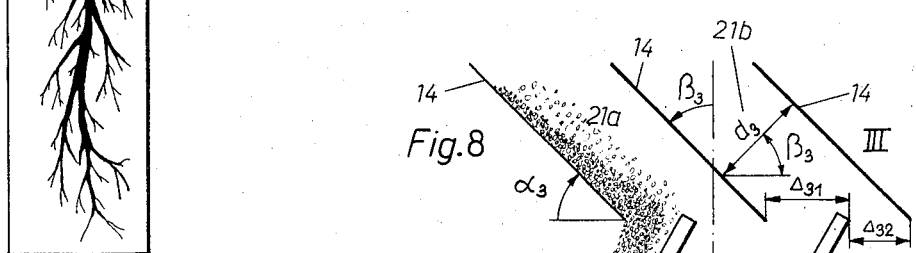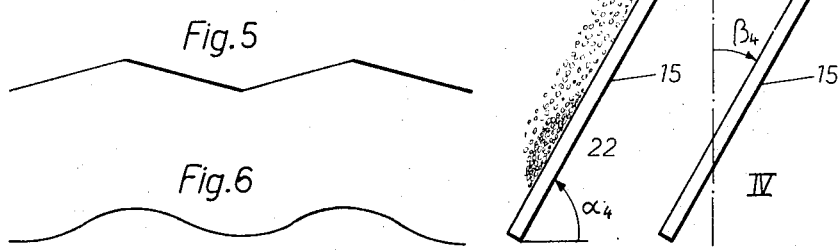

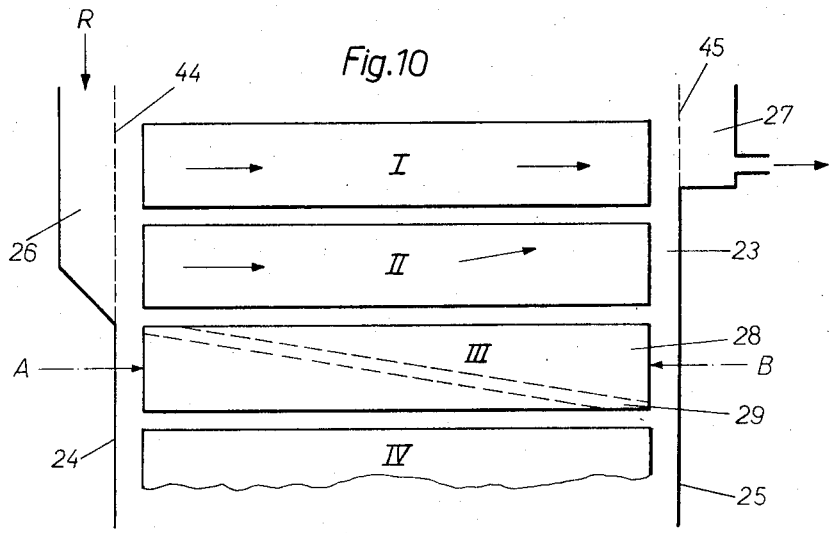
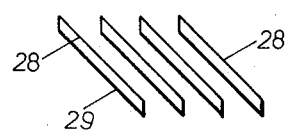
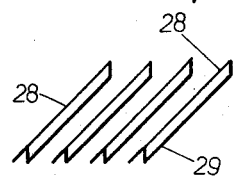
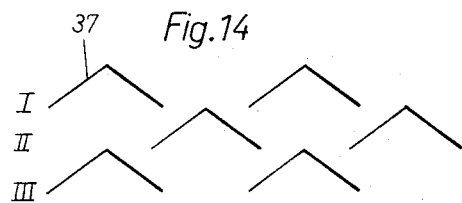
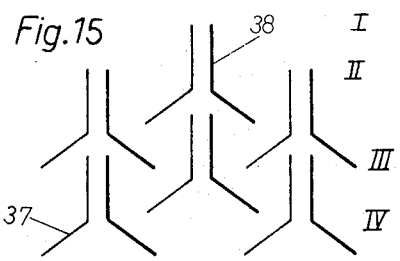

PROCESS AND APPARATUS FOR AT LEAST PARTLY REMOVING BY GRAVITY A PARTICULATE COMPONENT FROM A LIQUID DISPERSION

This invention relates to a process in which solid particles, liquid droplets or gas bubbles which are dispersed in a liquid are separated from said liquid by gravity and in which the feed mixture containing such constituents is treated in at least two successive stages, each of which is carried out in a plurality of substantially identical separating spaces, which are connected in parallel and in which material is collected on and travels along inclined boundary surfaces whereas the collected material is discharged from each chamber at one point and the liquid at a different point. The invention also relates to an apparatus for carrying out this process.

Upcurrent classifying apparatus are known, in which a rising stream of liquid is maintained, solids to be separated by particle size are charged into said stream, and solid-liquid mixtures (fractions) are withdrawn from said stream. The solid constituents of said mixtures consist of particles having diameters lying within a specific range of the original particle size distribution. The fractions contain a considerable amount of liquid so that liquid must be separated, e.g., in settling tanks or the like, after the treatment in the classifying apparatus and outside thereof. In such classifying apparatus (see, e.g., the French Pat. specification No. 1,205,899), the entire stream of liquid is either deflected several times or divided into partial streams and the solids received on a collecting surface between two deflecting points or in a section of each partial stream are returned back into the stream or a partial stream. Care must be taken that such returned solids are again washed by the liquid and for this purpose the solids must be dispersed as finely as possible. For this reason, the paths of the solids which subside at the feeding point cross the stream or partial stream of liquid.

A continuous maintenance of a rising liquid stream at a velocity which must be exactly controlled, because said velocity has a critical influence on the parting size, and the dispersion of the particulate solids over the cross-section of flow, are characteristic features of the operation of classifying apparatus. Such apparatus impose a limit on the concentration of the particulate solids in the liquid because the separation depends on the action of the stream on each particle so that the latter must not obstruct each other. The compliance with these requirements has an adverse effect in every separating process and in every separating apparatus in which is desired to separate the dispersed material and the liquid as far as possible so that suspensions of solids can be thickened to a high concentration, and in which this separation should be effected in the shortest possible time.

This object can be accomplished in a process of the kind defined first hereinbefore, in which process, in accordance with the invention, the traveling material is conducted in all stages and at the transitions between these stages along a path which differs from the flow path of the liquid and in which the angle between the horizontal components of the velocities of travel of the collected material is changed by at least 90° at the transition between these stages so that the collected material traveling over the collecting surfaces of one stage can be transfered to the collecting surfaces of the next following stage without traversing the liquid stream. At the deflecting points, the collected material traveling on or over a collecting surface is directly transferred to the collecting surface of the next stage so that there is a re-mixing of the two components which are to be separated and which have already been partly separated.

The most important aspects will now be discussed with reference to the behavior of suspensions of solids (slurries) during a thickening treatment. A thickening treatment should generally result in a solids concentration which is as high as possible because in that case the need for an expensive subsequent treatment in filter presses, on suction filters etc. may be eliminated or at least greatly restricted. During a sedimentation of a slurry, a settling area is formed in which the concentration is so low that the solids of the slurry fall at an almost uniform velocity because in that area there is no mutual obstruction of the particles or such obstruction is negligible. As the concentration increases, this obstruction increases progressively so that the terminal velocity decreases quickly.

It may be assumed that a particle P is initially disposed in a vertical vessel at a time $t=0$ on a level H over the bottom of the vessel and in accordance with Stokes' law reaches said bottom after a time T (see FIG. 1 of the accompanying drawings). In an inclined vessel (see FIG. 2 of the accompanying drawings), such particle will reach the bottom after a time Y, which is generally shorter than T. In the inclined vessel of FIG. 2, the height of fall in the liquid and with it the settling path is smaller than in the vertical vessel and the settling time $t_1$ is smaller than T. However, the particle slides on the wall of the vessel for a time $t_2$ before reaching the bottom of the vessel. Hence $Y = t_1 + t_2$. With thin slurries and small particles, $t_2$ is negligible compared to $t_1$, and the settling times may be shortened if, as is proposed in the French Pat. specification No. 1,205,899, the body of slurry is divided into numerous layers, which are defined by parallel inclined walls. Where a thickening is desired, other conditions are obtained and the significance of $t_2$ increases with an increase of the concentration of solids.

In inclined pipes, tongues are formed (see FIG. 3 of the accompanying drawing) when the concentration is above a certain value. The highest concentration of the subsiding material and the highest friction will be obtained adjacent to that layer of particles which adjoins the settling surface whereas the subsiding material remains in a loose condition on the same level close to the upper portion of the pipe wall.

Owing to the high concentration of the underside of the layer, the sliding movement is interrupted there and the overlying subsiding material, which is still loose, is strongly braked. Under such circumstances, the total of times $t_1$ and $t_2$ may become as large as or larger than T, and the advantages which may be afforded by the use of inclined layers are eliminated because the reduction of the sedimentation time alone is not decisive. On the other hand, the process according to the invention enables a concentration of suspensions of solids to end concentrations which have not been possible before, and a qualitatively satisfactory separation of the liquid from constituents dispersed therein, in a time which is much shorter than that required before.

The liquid which rises in response to the settling of subsiding particles is desirably collected in at least one stage and is conducted to an area which is disposed outside the settling areas, and said liquid is preferably recycled to the feed mixture being received.

The re-stratification of the traveling material at the transitions between the successive separating spaces causes that layer of this material which has the lowest water content to lie on loosened particulate layers so that a rapid travel is ensured.

This process may be carried out by an apparatus which comprises a tank body, which is provided near its top with an inlet for receiving a feed mixture and in which a number of collecting surfaces are accommodated, which are inclined from the horizontal and which define separating spaces, and which tank body is provided with outlets for the liquid and for the constituents which have been separated therefrom and which travel along the collecting surfaces, in which apparatus, according to the invention, at least two courses of identically designed and arranged collecting surfaces are provided, the courses are vertically spaced, the collecting surfaces of adjacent courses are horizontally staggered so that each of two collecting surfaces of one course communicates with two mutually adjacent separating spaces of the adjacent course, and two collecting surfaces which belong to courses lying one over the other and which become effective in succession have inclinations having different signs.

In a desirable arrangement, the horizontal projections of any two collecting surfaces which become effective in succession and belong to courses which are arranged one over the other overlap in a zone which has a width that is larger than the horizontal spacing between two collecting surfaces of one course.

Further advantages and features of the invention will be described more fully hereinafter with reference to embodiments shown by way of example in the accompanying drawings, in which FIG. 1 shows a vertical settling vessel, FIG. 2 an inclined settling vessel, FIG. 3 the accumulation of the settled material in an inclined settling vessel, and FIG. 4 a separating apparatus according to the invention.

FIGS. 5 and 6 show profiles of collecting surfaces.

FIGS. 7 and 8 show the re-stratification mechanism.

FIG. 9 shows the formation of a liquid stream flowing along the uppermost generatrix of an inclined pipe.

FIG. 10 shows another embodiment of the invention.

FIGS. 11 and 12 are elevations showing the collecting surfaces as viewed in the directions designated A and B, respectively, in FIG. 10.

FIGS. 14 and 15 are diagrammatic representations of the collecting surfaces of FIG. 13.

Figure 4:
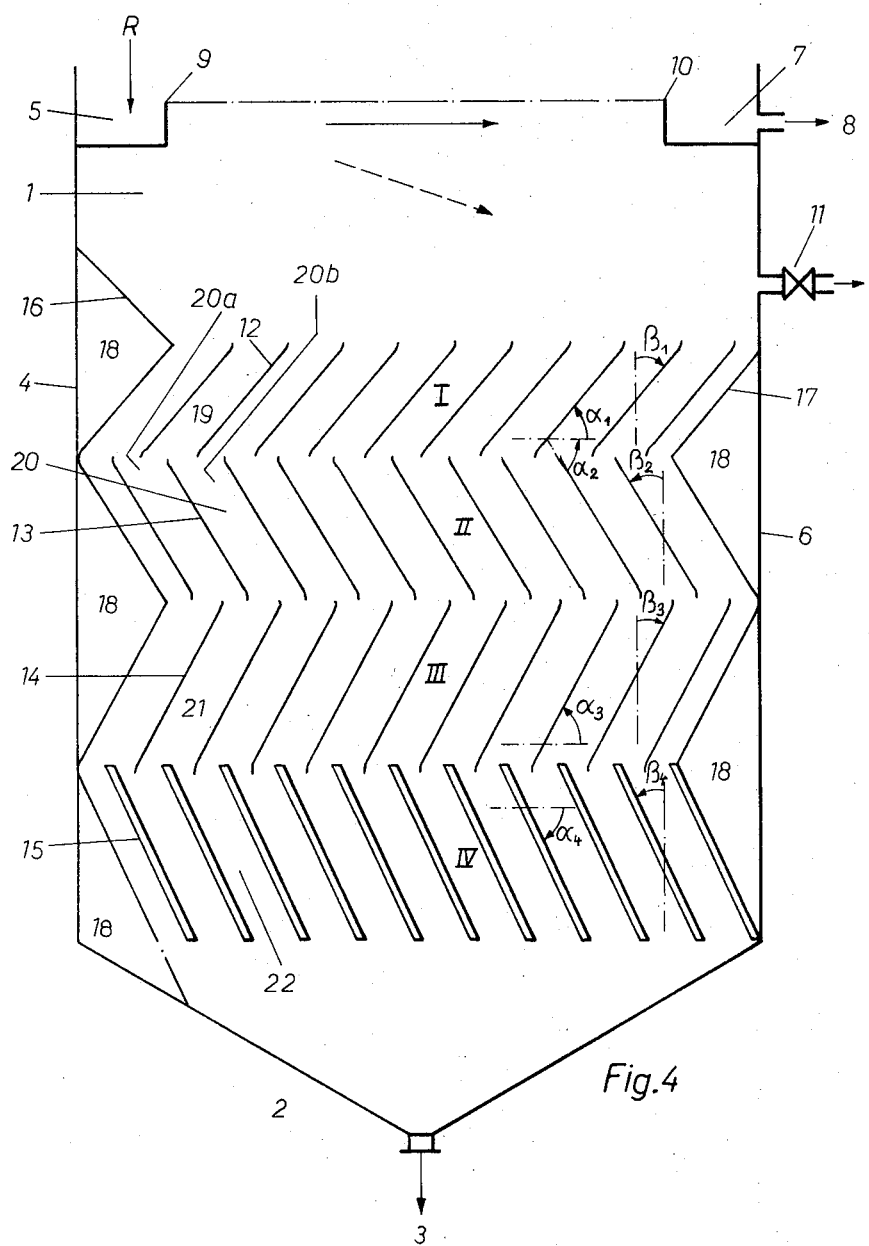

The apparatus shown in FIG. 4 comprises a settling tank which comprises a parallelepipedic tank body 1 and a funnel-shaped bottom 2, to which an outlet 3 is attached at the lowermost point. A feed trough 5 is provided near the top edge of one side wall 4. An outlet trough 7 provided with an outlet 8 is arranged near the edge of the opposite side wall 6. The side wall edges 9 and 10 or the top edges of the troughs 5 and 7, which project toward the interior of the tank body for an improved utilization of space, form an overflow for the feed mixture R, which is received at 5, and an overflow for the separated liquid. A shut-off valve 11, which may consist of a lift valve or gate valve, is provided below the outlet trough 7. That portion of the interior of the tank body which is disposed above the valve 11 does not contain any internal fixtures. That portion of the interior of the tank body which extends from its junction to the bottom 2 to a level closely spaced below the valve 11 accommodates collecting surfaces, which are grouped in, e.g., four courses I to IV. Each of these overlying courses comprises a number of collecting surfaces 12 to 15 or 13 to 15. The collecting surfaces of each course are parallel to each other and are inclined from the horizontal by slip angles $\alpha_1$ to $\alpha_4$, and from the vertical by the respective complementary angles $\beta_1$ to $\beta_4$. These collecting surfaces may consist of substantially flat plates or of profiled plates having a relatively shallow profile (FIGS. 5 and 6). It will be recommendable to connect one edge of each of the outermost collecting surfaces to the adjacent side wall 4 or 6 of the tank body so that dead spaces 18 are shut off by guide surfaces 16 and 17. The collecting surfaces 12 to 15 define separating spaces 19 to 22. The collecting surfaces of each course are offset in a horizontal direction from the collecting surfaces of the adjacent course or courses so that each of the separating spaces, such as 19, of one course, such as I, except for the last course, communicates with two separating spaces, e.g., 20a and 20b, of the adjacent course or courses. The collecting surfaces of adjacent courses have inclinations of mutually opposite signs so that the angles of inclination, e.g., $\alpha_1$ and $\alpha_2$, of collecting surfaces which become effective in succession, e.g., 12 and 13, and belong to courses which lie one over the other, e.g., I and II, are disposed on opposite sides of a horizontal plane which extends through the transition zone between the successive collecting surfaces.

The settling tanks may have, for instance, a length and a width of 7 meters and a height of 5 meters. In a tank body which is free of collecting surfaces and other internal fixtures and has these dimensions, the sedimentation area is 49 square meters. In such tank, 15 cubic meters of a flocculated kaolin slurry having a solids content of 40 grams per liter can be thickened to a solids content of 200 grams per liter at a rate of 15 cubic meters per hour.

The concentration may be increased, e.g., to a solids content of 300 grams per liter although this involves a considerable reduction of the throughput rate of 3 cubic meters per hour. This disadvantage is avoided in the settling tank which is designed according to the invention and with which the same end concentration can be obtained with a much larger throughput if the tank has the same size and is provided with four courses of collecting surfaces. It will be desirable to use different values for the slip angles $\alpha_i$ and the complementary angles $\beta_i$, where ($i = 1, 2, 3 \ldots$), in such a manner that $\beta_1 > \beta_2 > \beta_3 > \beta_4$ so that the inclination of the collecting surfaces from the horizontal increases progressively as the load applied thereto per unit of area increases from course to course. It has proved desirable to select the angles $b_i$ so that the condition $35° \leq \beta_1 \leq 70°$ is met. For instance, the uppermost course I may have a height of 70 centimeters and the angle $b_1$ may be 55° and the spacing of the collecting surfaces 12 may be 12 centimeters, whereas the angles $\beta_2, \beta_3, \beta_4$ may amount to 45°, 35° and 25°, respectively, and the collecting surfaces 13, 14, and 15 are correspondingly larger. With such settling tank, the desired end concentration of 300 grams per liter may be obtained with a throughput rate of 15 cubic meters per hour, which means that a rate which is five times that of the tank which has no internal fixtures is obtained without need for more space. This increase of the rate is due to the increase of the effective sedimentation area and particularly to the re-stratification of the travelling material at the transition from one separating space to the next following separating space.

The re-stratification mechanism is illustrated in FIGS. 7 and 8, from which it is apparent how the stratification of the material traveling along a collecting surface is eliminated at the transition between two courses. The particulate solids which have been received by the collecting surface 12 or 14 and near the lower edge of said surfaces have settled to a relatively closely packed layer, which has a low tendency to slip. From this layer, the solids fall across the lower edge into the next following separating space and in doing so do not traverse the liquid which is disposed in that separating space over the material which has settled therein so that the separation which has been effected in that space is not disturbed. On the other hand, the stratification is eliminated because that stratum which is nearest to the collecting surface 12 or 14 is not immediately received by the collecting surface 13 or 15 but must first settle once more. Owing to the considerable concentration, this renewed settling begins slowly, at a distance from the transition. The lower edges of the collecting surfaces 12 or 14 and the upper edges of the collecting surfaces 13 or 15 lie substantially in a common horizontal plane and are relatively offset by horizontal distances $\Delta_{i1}$ or $\Delta_{i2}$, where $$\Delta_{i1} + \Delta_{i2} = d_i/\cos \beta_i,$$

$i = 1, 2, 3, 4$, and $d_i$ is the shortest distance between adjacent collecting surfaces of a course.

It may be recommended, particularly in the lower courses III, IV ... ($i = 3, 4, \ldots$), to select the distances $\Delta_{i1}$ and $\Delta_{i2}$ in accordance with the height of the layer of material traveling in the respective separating space so that $\Delta_{i1} > \Delta_{i2}$ (see FIG. 8). In an apparatus having given dimensions, this feature results in an increased path cross-section for this material.

The relocation of the subsiding solid particles is accompanied by a movement of the liquid which is displaced by the subsiding particles. This phenomenon is a quasi-steady state process and has no significance at low concentrations whereas it may well have practical significance at the desired high concentrations.

If a relatively thick kaolin suspension which is colored with potassium permanganate is fed into a tubular vessel having an axis which includes an angle of 30° with the vertical, the condition represented in FIG. 9 will soon be obtained. The formation of a flow path is initiated at a small distance over the bottom and this flow path extends substantially along the uppermost generatrix of the tube. The water having a dark appearance rises along this flow path without obstruction. If, in accordance with the invention, collecting surfaces are used which have channels, e.g., in the shape of a roof or wave (FIGS. 5, 6), this measure does not only result in a material-saving stiffening of these surfaces, which stiffening is desired in lower courses, but also in the formation of such flow paths, in which the liquid can rise virtually without resistance and without adversely affecting the sedimentation. This is due to the fact that owing to the inclination the height in which the rise of the liquid is obstructed by the existing particles is much reduced.

That portion of the interior of the tank body which is disposed above the shut-off valve 11 (FIG. 4) constitutes a clarification space, which is free of internal fixtures. The slurry disposed in said space has such a low concentration that the velocity of fall of individual solid particles therein will not be appreciably reduced by mutual obstruction.

The feed mixture R is received by the feed trough 5 continuously or intermittently and is pre-thickened in the uppermost portion of the interior of the tank body. On the level of the shut-off valve 12 the mixture has reached such a concentration that the collecting surfaces arranged according to the invention become effective. The material which has subsided across these surfaces is discharged from the tank body through its outlet 3. The liquid is withdrawn during continuous operation through the outlet trough 7 and the outlet 8 and during intermittent operation through the shut-off valve 11 because a horizontal sedimentation is effected, which has the result that the solids concentration at the point of attachment of said valve is equal to that of the liquid which rises between the collecting surfaces.

A modified apparatus as shown in FIG. 10 is recommended for a thickening of slurries having a higher initial concentration. The parallelepipedic tank body 23 of said apparatus contains courses I to IV etc. of collecting surfaces. These courses lie one over the other and extend into the levels of the feed mixture R which is received and of the liquid which is to the discharged, respectively, so that paths for the travel of the settled material are provided throughout the interior of the tank body.

Experience has shown that the velocity of the liquid which rises on the underside of the collecting surface, particularly in the upper courses, may be so high that turbulent flow areas are formed which disturb the settling process. This danger will be eliminated if the rising liquid is conducted from the separating spaces in which a separation is effected and into a zone where this liquid is innocuous. Hence, a difference compared to FIG. 4 resides in that the collecting surfaces are normal to the side walls 24 and 25 of the tank body, to which the feed trough 26 and the outlet trough 27 are attached.

The feed trough and the outlet trough communicate with the interior of the tank body through perforated partitions, such as plates or wire screens 44 and 45, respectively, and extend over different heights. The feed trough 26 extends over the height of two courses (I and II), and the discharge trough 27 extends over the height of only one course (1).

The rising liquid may be intercepted and conducted away in a very simple manner with the aid of guide bars or strips 29, which are placed on the collecting surfaces 28 and extend transversely across the same.

In this way, the liquid is conducted into a gap between the side wall 24 on the inlet side of the tank body and the collecting surfaces. The liquid rises in said gap and reaches the point where the feed mixture enters and a separation does not yet take place. In most cases it will be sufficient if each of the collecting surfaces 28 of that course III which is disposed directly below the feed trough 26 is provided with a guide strip 29, which extends from the upper corner on the inlet side to the lower corner on the outlet side of each collecting surface and is at least locally secured to said surface along the upper longitudinal edge of the strip and includes an angle with the collecting surface, e.g., in that it vertically depends therefrom. FIGS. 11 and 12 show this arrangement in elevation viewed in the directions A and B, respectively, in FIG. 10.

The effect of the conducting of rising liquid from zones which are important for the separation process has been confirmed by a comparative experiment. When a clay slurry was thickened in an apparatus of the type which has been described hereinbefore but in which the guide strip was omitted, the liquid flowing over through the outlet trough 27 contained 1.5 grams clay per liter. When the strips 29 were incorporated, the clay content decreased to 0.1 gram per liter.

The invention may be used to advantage also in the degasification of liquids. An apparatus which is suitable for this purpose will now be described with reference to FIGS. 13 to 17.

The bottom 31 (FIG. 13) of the substantially parallelepipedic tank body 30 is inclined toward the side walls 32, 33 of the tank body. An overflow pipe 34 is attached to the lowermost point and defines the highest level to which the tank body can be filled. An inlet for the feed mixture is disposed approximately in the center line of the tank body and consists of a vertical pipe 35, and a distributing plate 36, which precedes the opening of the pipe. This opening is disposed slightly below the liquid level. Collecting surfaces 37 grouped in a plurality of courses I to IV are installed in the interior of the tank body. The collecting surfaces 37 are preferably identical and each of them consists of a trough profile, preferably a roof profile (FIG. 14). The mutually parallel profiles are not normal to the side walls of the trough but are inclined relative thereto. The angle $\beta$ included by the ridges with the horizontal may be small and may amount, e.g., to 5°. The trough profiles of each course are laterally spaced apart by distances which are smaller than the width of the profile, and the profiles of adjacent courses are laterally staggered so that the horizontal projections of the profiles of such courses overlap in part. Each profile may be closed by an end plate 39 (FIG. 16) at its upper end. A connecting pipe 38 is attached to the profile close to its upper end and extends between the profiles of the next upper course (FIG. 15). Each collecting surface 37 is divided into two zones, which lie on opposite sides of the ridge. One zone of each profile cooperates with the confronting zone of the next upper or next lower profile of the adjacent course. Those zones of two adjacent courses which become effective in succession have inclinations having different signs.

In the operation of the apparatus which has just been described, the liquid which contains gas bubbles is received through the feed pipe 35. The gas is collected by the collecting surfaces 37, which have a trough-shaped profile, and rises along the ridges and then through the connecting pipes and is discharged through the connecting pipes 40 of the uppermost course I. From these connecting pipes, which protrude above the liquid level, the gas may be discharged into a manifold, which is not shown. The degasified liquid is taken through the overflow pipe 34.

Information as to the effect of the built-in collecting surfaces 37 can be obtained by the following comparative experiments. A tank body 30 was used, which corresponded to the one shown and had a height of 1 meter and a bottom area of 1 square meter and which contained no collecting surfaces. Water which was distributed by the distributor plate 36 was fed into said tank body. This water contained a multiplicity of air bubbles having such diameters as to rise at a velocity of 0.1–30 centimeters per second. The de-aeration was satisfactory at throughput rates of 3 cubic meters per hour. At a rate of 4 cubic meters per hour, the outflowing liquid still contained a considerable amount of air bubbles. Ten courses of roof-shaped profiles having an influded angle of 150° and a ridge inclination of 5° were then incorporated and a water-air mixture having the same nature was supplied. The throughput rate at which a satisfactory de-aeration was achieved was increased up to 40 cubic meters per hour.

The invention may also be used to advantage to separate liquid components, one of which consists of droplets dispersed in the other liquid. If the dispersed component tends to rise, it may be removed from the feed mixture by means of an apparatus which is designed like that in FIG. 13. For a comparison, the experimental apparatus just described was used to separate an emulsion of oil in water in which the oil droplets tended to rise at a velocity of 0.01 to 0.1 centimeter per second. When the collecting surfaces were removed from this apparatus, the highest throughput at which a satisfactory separation could be obtained was about 200 liters per hour. When ten courses were built in, the oil could be separated just as satisfactorily at a throughput rate of 2 cubic meters per hour, which means a ten-fold increase.

Figure 13:
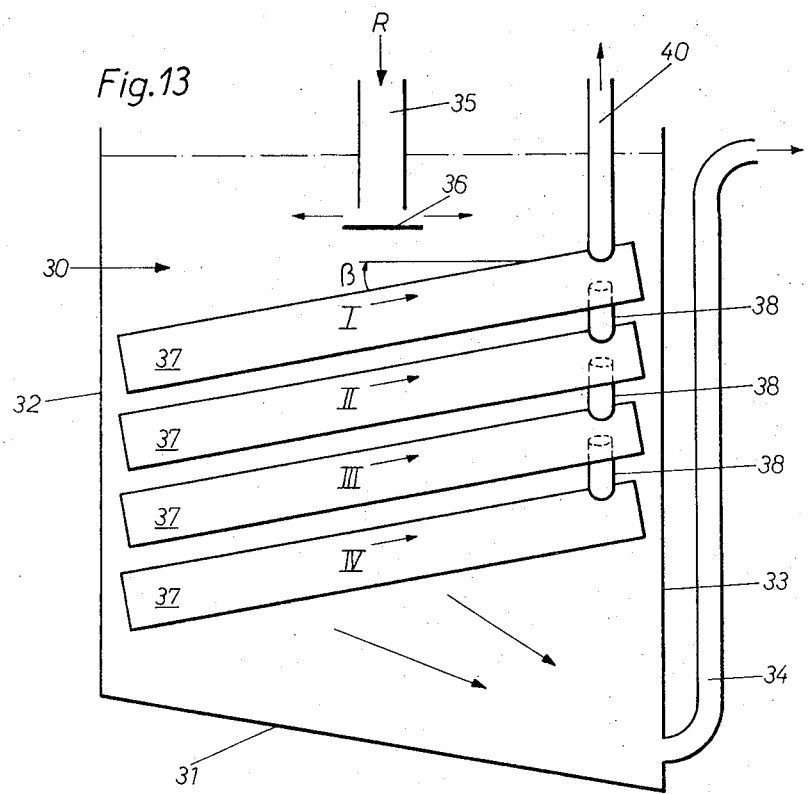
FIG. 13 shows another embodiment of the invention, particularly for a separation of gas bubbles.
Figure 16:
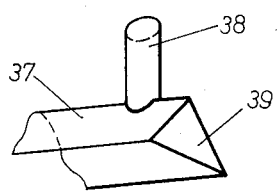
FIG. 16 shows the upper end of a collecting surface shown in FIG. 13.
Figure 17:
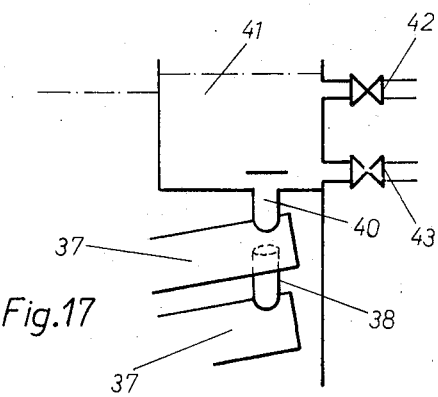
FIG. 17 shows an embodiment of the outlet for discharging liquid droplets which have been separated by an apparatus as shown in FIG. 13.
Figure 18:
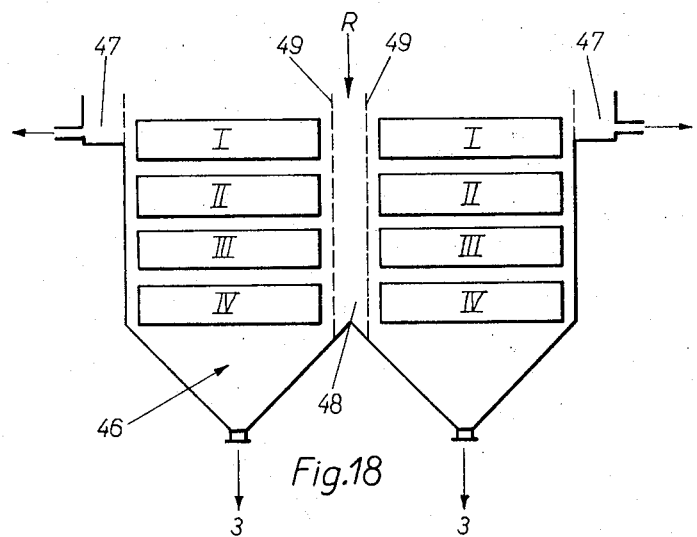
FIG. 18 is a diagrammatic view showing another embodiment of the invention.

In a gas-removing separator according to the invention, such as is shown in FIG. 13, it is not difficult to discharge the collected gas through the connecting pipes 38 and 40 even when the gas is collected at a varying rate. On the other hand, the removal of the collected liquid in apparatus used to remove oil or similar liquid cannot readily be removed. In this case, the use of a separate outlet device is recommended. Such device is shown in FIG. 17 and consists of a narrow, trough-like receiving vessel 41. The connecting pipes 40 extending from the uppermost collecting surfaces 37 open at the bottom of said vessel. Two shut-off valves 42 and 43, such as plug valves, lift valves or the like, are arranged in the side wall of the vessel. One valve 43 is disposed near the bottom and the other valve 42 on a higher level. The upper shut-off valve 42 is opened only to such an extent that the rate at which the lighter liquid can flow out does not exceed or exceeds only slightly the smallest rate at which said lighter liquid is collected whereas the liquid level in the receiving vessel 41 increases when said lighter liquid is collected at a higher rate. Any portions of the heavier liquid which may have been entrained through the lower shut-off valve 43 may be drained from time to time. FIG. 18 shows by way of example another embodiment of the apparatus according to the invention. In practice, separating plants are required to operate at high rates whereas the velocity of flow must not be excessive in order to avoid turbulence, which would reduce the efficiency of the separating process. The use of large settling areas, i.e., of numerous collecting surfaces, permits of minimizing the velocity of flow. A twin plant of the kind which is diagrammatically shown in FIG. 18 has proved highly satisfactory for a clarification and thickening of slurries. The tank body 46 is provided at two mutually opposite side walls with respective overflow troughs 47 for the liquid and centrally between these two walls with an inlet 48 for the feed mixture. This inlet is provided with two substantially parallel perforated plates 49 or the like, which extend preferably as far as to the bottom of the tank body. Collecting surfaces in courses I to IV, such as is shown in FIGS. 4 or 10, are accommodated in the two chambers which are defined by these plates and the side walls of the trough. The feed slurry R which is received is simultaneously dispersed throughout the cross-sections of courses I to IV. In this way, the velocity of flow at a given throughput rate is divided by two, compared to simple plants, and this is accomplished with simple means.

Figure 19:
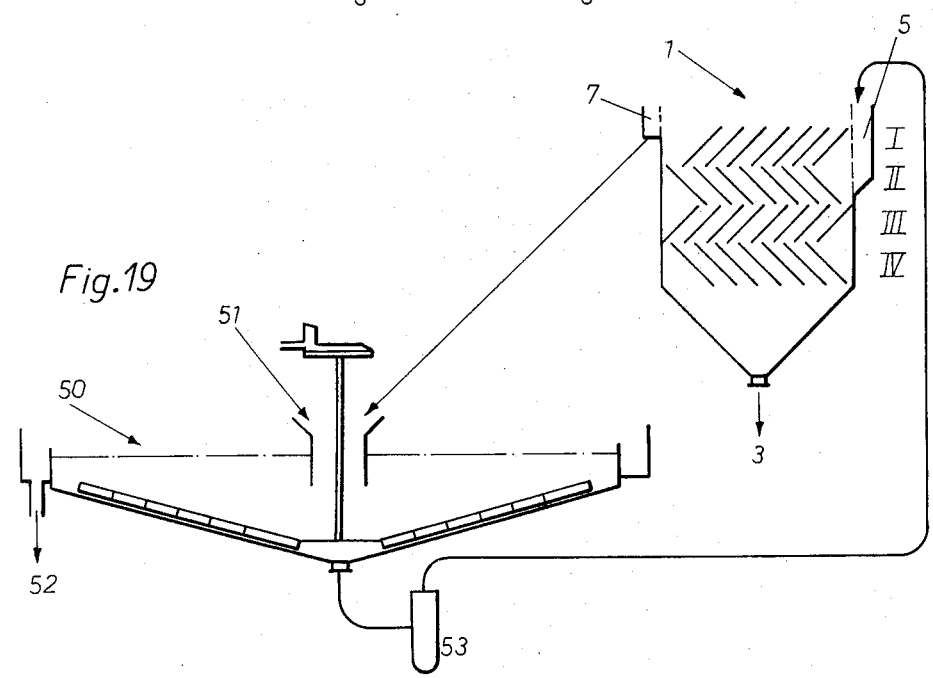
FIG. 19 is a diagrammatic view illustrating the use of the apparatus according to the invention in conjunction with a circular thickener.

A practical embodiment of th operation of apparatus according to the invention in conjunction with a circular thickener will now be explained with reference to FIG. 19.

A circular thickener 50 is 20 meters in diameter and provided with a raking device. The thickener 50 is fed, for instance, with waste water from a foundry sand recovering machine at a rate of 300 cubic meters per hour. This starting slurry is received at 51 and has a solids content of 5 grams per liter. A flocculation agent can be added to obtain clear sewage, which is discharged at 52. Owing to the raking operation, the sediment which is discharged cannot be concentrated to a solids content of more than 100 grams per liter.

This clarifying plant is coupled to an apparatus according to the invention, of the kind shown in FIG. 4. That apparatus has a base area of 30 square meters. The sediment (16 cubic meters per hour, solids content 100 grams per liter) is fed into the feed trough 5 by a pump 53.

In this combination, the apparatus according to the invention serves only for thickening. The overflowing water remains somewhat turbid. This is not significant because it is recycled at a rate of only 8 cubic meters per hour from the outlet trough 7 to the starting slurry supplied at the high rate of 300 cubic meters per hour.

The sediment which is discharged at 3 has a solids concentration of 200 grams per liter. This results in large savings as regards the capital requirements and operating costs involved in a succeeding suction filter apparatus. The slurry which flows over from the separator cntains 2 grams solids per liter and increases the load on the large circular thickener only by about 3 percent. This involves no disadvantages.

What is claimed is:

1. A process of at least partly removing by gravity a particulate component from a liquid dispersion which process comprises providing a feed mixture which comprises a liquid and a particulate component which is dispersed in and differs in specific gravity from said liquid, treating said feed mixture in a plurality of successive stages, each of which comprises a plurality of substantially identical separating spaces defined by inclined collecting surfaces, collecting said particulate component on said collecting surfaces and causing said particulate component to travel along each collecting surface and from the collecting surfaces of each preceding stage to the collecting surfaces of the next succeeding stage along a predetermined path of travel, causing the liquid to flow in said separating spaces and from each space along a predetermined liquid flow path, which is spaced from said path of travel, withdrawing said collected particulate component from the collecting surfaces of each stage in a first withdrawal area, withdrawing the liquid from the separating spaces of each stage in a second withdrawal area, which is spaced from said first withdrawal area, and changing the angle between the horizontal components of the velocity of travel of said collected particulate component along said path of travel by at least 90° as said collected particulate component is transferred from the collecting surfaces of each preceding stage to the collecting surfaces of the next succeeding stage so that said path of travel between successive stages extends outside said liquid flow path.

2. A process as set forth in claim 1, in which said particulate component comprises solid particles.

3. A process as set forth in claim 1, in which said particulate components comprise liquid droplets.

4. A process as set forth in claim 1, in which said particulate component comprises gas bubbles.

5. A process as set forth in claim 1, in which said particulate component has a higher specific gravity than said liquid and tends to subside therein, liquid is caused to rise in response to the settling of said particulate component, and said rising liquid is intercepted in at least one of said stages and is conducted to an area which is disposed outside said separating spaces.

6. A process as set forth in claim 5, in which said rising liquid is recycled to said feed mixture.

7. Apparatus for carrying out a process of at least partly removing by gravity a particulate component from a liquid in which said component is dispersed, which apparatus comprises a tank body;

feed inlet means connected to an upper portion of said tank body;

at least two courses of collecting surfaces, which are substantially identically designed and arranged in each course and are accommodated in said tank body and inclined from the horizontal, said courses being vertically spaced, adjacent collecting surfaces of each course defining separating spaces, the collecting surfaces of adjacent courses being horizontally offset so that each separating space defined by two adjacent collecting surfaces of each course communicates with two mutually adjacent separating spaces defined by collecting surfaces of an adjacent course, the inclinations of a collecting surface of one stage and an adjacent collecting surface of an adjacent stage having different signs;

liquid outlet means connected to said tank body; and particulate component outlet means connected to said tank body and adapted to receive particulate component which has collected on and traveled along said collecting surfaces.

8. Apparatus as set forth in claim 7, in which the horizontal projections of a collecting surface of one course and of an adjacent collecting surface of an adjacent course overlap in an area which is larger in width than the horizontal distance between the adjacent collecting surfaces of one course.

9. Apparatus as set forth in claim 7, in which said tank body is parallelepipedic and comprises mutually opposite first and second side walls, and a bottom having a lowermost area, said feed inlet means are connected to said first side wall, said liquid outlet means are connected to said second side wall, and said particulate component outlet means are connected to said lowermost area.

10. Apparatus as set forth in claim 9, which serves for a thickening of slurries.

11. Apparatus as set forth in claim 9, in which said tank body comprises mutually opposite third and fourth side walls, which are at right angles to said first and second side walls, and said collecting surfaces are formed by flat plates which extend substantially normal to said third and fourth side walls.

12. Apparatus as set forth in claim 9, in which said tank body comprises mutually opposite third and fourth side walls, which are at right angles to said first and second side walls, and said collecting surfaces are formed by profiled members defining troughs which extend parallel to said third and fourth side walls.

13. Apparatus as set forth in claim 9, in which the collecting surfaces of at least one upper course have lower edges and the collecting surfaces of the next lower course have upper edges which lie substantially in the same horizontal plane as said lower edges.

14. Apparatus as set forth in claim 9, in which the collecting surfaces of at least one upper course have lower edges and the collecting surfaces of the next lower course have upper edges which are disposed slightly above said lower edges.

15. Apparatus as set forth in claim 9, for treating a feed mixture in which said particulate component has a higher specific gravity than said liquid, in which apparatus said collecting surfaces of an upper course are formed by members having lower edges said collecting surfaces of the next lower course are formed by members having upper edges which are horizontally spaced from adjacent ones of said lower edges by a relatively larger horizontal distance on the side defined by the upwardly facing sides of said members than on the side defined by the downwardly facing sides of said members.

16. Apparatus as set forth in claim 9, in which the collecting surfaces of at least one upper course have a smaller angle of inclination than the collecting surfaces of the next lower course and said angles of inclination are between 35° and 70°.

17. Apparatus as set forth in claim 9, in which the collecting surfaces of each upper course have a smaller angle of inclination than the collecting surfaces of the next lower course and said angles of inclination are between 35° and 70°.

18. Apparatus as set forth in claim 9, in which said tank body has a top edge, the collecting surfaces of the uppermost course have upper edges disposed below said top edge, and an outlet conduit which incorporates a valve is connected to said second side wall of said tank body on a level which is slightly above said upper edges.

19. Apparatus as set forth in claim 9, in which said collecting surfaces are formed by members which are substantially normal to said first and second side walls and inclined from the horizontal, one of said courses is disposed next below said feed trough, and each of said collecting surfaces of said one course is spaced from said first side wall and downwardly inclined therefrom and provided on its underside with means defining a channel for guiding rising liquid upwardly toward said first side wall.

20. Apparatus as set forth in claim 9, in which said feed inlet means comprise a feed trough and a perforated partition through which said feed trough communicates with the interior of said tank body, said liquid outlet means comprise an outlet trough and a perforated partition through which said outlet trough communicates with said tank body, and at least one of said courses is contained within the vertical extent of said perforated partition of said feed inlet means.

21. Apparatus as set forth in claim 20, in which said perforated partition of said feed inlet means extends below said perforated partition of said liquid outlet means.

22. Apparatus as set forth in claim 7, in which said tank body is parallelepipedic and has a lowermost area, a liquid overflow pipe extends upwardly from said lowermost area and has an overflow opening in said tank body, said collecting surfaces are formed by substantially identical, inverted trough members having a top ridge line which is inclined from the horizontal, a connecting pipe is connected to each of said trough members adjacent to its upper end, and each of the connecting pipes which are connected to the trough members of each of the second and subsequent courses below said uppermost course have an opening disposed between trough members of the next higher course and trough members of the next but one higher course.

23. Apparatus as set forth in claim 22, which is designed to remove a particulate liquid component having a lower specific gravity than said liquid.

24. Apparatus as set forth in claim 22, in which said inverted trough members are roof-shaped.

25. Apparatus as set forth in claim 22, in which each of said trough members is closed at its upper end by an end plate.

26. Apparatus as set forth in claim 22, in which said connecting pipes connected to said trough members of the uppermost course have an opening above the lower edge of said overflow opening.

27. Apparatus as set forth in claim 26, in which
the connecting pipes connected to said trough members of the uppermost course are connected to a receiving basin having a bottom and
two shut-off valves are connected to said receiving basin adjacent to its bottom and on a higher level, respectively.

28. Apparatus as set forth in claim 22, in which said connecting pipes connected to said trough members of said uppermost course are connected to a manifold.

29. Apparatus as set forth in claim 7, in which
said tank body has mutually opposite side walls,
said liquid outlet means comprise two overflow troughs, which are respectively connected to said side walls,
said feed inlet means are disposed midway between said side walls,
two substantially parallel, spaced apart, perforated partitions extend in said tank body,
each of said partitions is disposed adjacent to one of said side walls and spaced therefrom to define a chamber therewith, and
two identical sets of courses of collecting surfaces are contained in respective ones of said chambers.

30. Apparatus as set forth in claim 29, in which said partitions consist of metal plates.

31. Apparatus as set forth in claim 29, in which said partitions extend as far as to the bottom of said tank body.

* * * * *